US012300422B2

(12) United States Patent
Igarashi et al.

(10) Patent No.: US 12,300,422 B2
(45) Date of Patent: May 13, 2025

(54) METHOD OF MANUFACTURING A COIL COMPONENT

(71) Applicant: Murata Manufacturing Co., Ltd., Kyoto-fu (JP)

(72) Inventors: Akio Igarashi, Nagaokakyo (JP); Yuuji Igarashi, Nagaokakyo (JP); Koji Onishi, Nagaokakyo (JP); Takuya Ishida, Nagaokakyo (JP); Takao Miyamoto, Nagaokakyo (JP)

(73) Assignee: Murata Manufacturing Co., Ltd., Kyoto-fu (JP)

( * ) Notice: Subject to any disclaimer, the term of this patent is extended or adjusted under 35 U.S.C. 154(b) by 608 days.

(21) Appl. No.: 16/782,982

(22) Filed: Feb. 5, 2020

(65) Prior Publication Data

US 2020/0258677 A1 Aug. 13, 2020

(30) Foreign Application Priority Data

Feb. 7, 2019 (JP) ................................ 2019-020881

(51) Int. Cl.
*H01F 7/06* (2006.01)
*H01F 27/28* (2006.01)
(Continued)

(52) U.S. Cl.
CPC ......... *H01F 27/29* (2013.01); *H01F 27/2828* (2013.01); *H01F 27/306* (2013.01);
(Continued)

(58) Field of Classification Search
CPC ...... H01F 41/069; H01F 41/076; H01F 41/10; H01F 2017/0093; H01F 27/2828; H01F 17/045; H01F 3/10
See application file for complete search history.

(56) References Cited

U.S. PATENT DOCUMENTS 4,774,394 A * 9/1988 Lemke .................. B23K 26/22 219/121.64
5,343,014 A * 8/1994 Ogino .................. B23K 26/323 219/121.64
(Continued)

FOREIGN PATENT DOCUMENTS

CN 1431753 A 7/2003
CN 103595216 A 2/2014
(Continued)

OTHER PUBLICATIONS

An Office Action; "Notice of Reasons for Refusal," mailed by the Japanese Patent Office on Sep. 21, 2021, which corresponds to Japanese Patent Application No. 2019-020881 and is related to U.S. Appl. No. 16/782,982 with English translation.

*Primary Examiner* — Paul D Kim
(74) *Attorney, Agent, or Firm* — Studebaker Brackett PLLC

(57) ABSTRACT

Advantage is taken of the fact that tin has a higher efficiency of absorption of a laser beam than, for example, copper. A method of manufacturing a coil component includes preparing a wire that includes a linear, central conductor and an insulating coating that covers a circumferential surface of the central conductor, preparing a metal terminal that is to be electrically connected to the central conductor at an end portion of the wire and that has a surface on which a tin-containing film that contains tin is disposed and above which at least the end portion of the wire is to be disposed, and welding the central conductor of the wire to the metal terminal by irradiating at least the tin-containing film with a laser beam with the end portion of the wire disposed along the tin-containing film.

9 Claims, 5 Drawing Sheets

(51) Int. Cl.

| | |
|---|---|
| ***H01F 27/29*** | (2006.01) |
| ***H01F 27/30*** | (2006.01) |
| ***H01F 41/069*** | (2016.01) |
| ***H01F 41/076*** | (2016.01) |
| ***H01F 41/10*** | (2006.01) |

(52) U.S. Cl.
CPC ......... *H01F 41/069* (2016.01); *H01F 41/076* (2016.01); *H01F 41/10* (2013.01)

(56) References Cited

U.S. PATENT DOCUMENTS

| | | | | |
|---|---|---|---|---|
| 8,771,015 | B2 * | 7/2014 | Inoue ....................... | H01R 4/70 439/604 |
| 9,305,698 | B2 * | 4/2016 | Takagi .................. | H01F 27/292 |
| 2003/0019656 | A1 | 1/2003 | Ajiki | |
| 2003/0129856 | A1 | 7/2003 | Takizawa et al. | |
| 2009/0128275 | A1 * | 5/2009 | Yagasaki ................. | H01F 17/04 336/83 |
| 2014/0306555 | A1 | 10/2014 | Shen et al. | |
| 2015/0042436 | A1 | 2/2015 | Arimitsu et al. | |
| 2018/0097327 | A1 | 4/2018 | Murakami et al. | |
| 2019/0358749 | A1 * | 11/2019 | Satou ..................... | B23K 26/21 |

FOREIGN PATENT DOCUMENTS

| | | | |
|---|---|---|---|
| CN | 107887159 | A | 4/2018 |
| DE | 10 2009 013110 | B4 | 2/2018 |
| JP | 2002-015624 | A | 1/2002 |
| JP | 2002-117913 | A | 4/2002 |
| JP | 2007-150032 | A | 6/2007 |
| JP | 4184394 | B2 | 11/2008 |
| JP | 2011-243685 | A | 12/2011 |
| JP | 2015-035473 | A | 2/2015 |
| JP | 2016-134590 | A | 7/2016 |
| WO | 2015/045955 | A1 | 4/2015 |

* cited by examiner

METHOD OF MANUFACTURING A COIL COMPONENT

CROSS-REFERENCE TO RELATED APPLICATION

This application claims benefit of priority to Japanese Patent Application No. 2019-020881, filed Feb. 7, 2019, the entire content of which is incorporated herein by reference.

BACKGROUND

Technical Field

The present disclosure relates to a coil component and a method of manufacturing the coil component, and more particularly, to a method of connecting a wire and a metal terminal to each other by laser welding, and a connection structure.

Background Art

An interesting technique for the present disclosure is disclosed in, for example, Japanese Patent No. 4184394. FIG. 5, FIG. 6, FIG. 7, and FIG. 8 respectively correspond to FIG. 2, FIG. 3, FIG. 4, and FIG. 5 in Japanese Patent No. 4184394. FIG. 5 to FIG. 8 illustrate a flange portion 71 that is a part of a core that is included in a coil component, a metal terminal 72 that is disposed thereon, and an end portion of a wire 73 that is connected to the metal terminal 72.

As well illustrated in FIG. 5 and FIG. 8, the wire 73 includes a linear, central conductor 74 and an insulating coating 75 that covers the circumferential surface of the central conductor 74. The metal terminal 72 is formed by using a metal plate that is composed of, for example, phosphor bronze and includes a base 77 that is disposed on an outer end surface 76 of the flange portion 71 and a receiving portion 79 that extends from the base 77 across a bent portion 78 and that receives the end portion of the wire 73. As well illustrated in FIG. 5, the metal terminal 72 also includes a weld piece 81 that extends from the receiving portion 79 across a first folded portion 80 and that is welded to the central conductor 74 of the wire 73, and a holding portion 83 that extends from the receiving portion 79 across a second folded portion 82 and that holds the wire 73 for positioning.

FIG. 5 and FIG. 6 illustrate states of the weld piece 81 before a welding process is performed, and FIG. 7 and FIG. 8 illustrate states thereof after the welding process is performed. FIG. 7 and FIG. 8 also illustrate an expanding portion 84 that is produced by welding. The expanding portion 84, which is also referred to as a melt ball or a weld nugget portion, is produced such that a melted metal is formed into a ball shape due to surface tension during welding and is cooled and solidified.

The welding process will now be described in detail. Before the welding process, the weld piece 81 and the holding portion 83 are not bent toward the receiving portion 79 of the metal terminal 72 and do not face the receiving portion 79. FIG. 5 illustrates a state where the holding portion 83 faces the receiving portion 79, and the weld piece 81 is not bent toward the receiving portion 79.

The wire 73 is first placed on the receiving portion 79 of the metal terminal 72. To maintain this state temporarily, the holding portion 83 is bent from the second folded portion 82 toward the receiving portion 79 such that the wire 73 is interposed between the receiving portion 79 and the holding portion 83.

Subsequently, as illustrated in FIG. 5, a portion of the insulating coating 75 of the wire 73 nearer than a portion interposed between the receiving portion 79 and the holding portion 83 to an end is removed. The portion of the insulating coating 75 is removed by using, for example, laser beam irradiation. As well illustrated in FIG. 5 and FIG. 8, a portion of the insulating coating 75 in contact with the receiving portion 79 is not removed and remains.

Subsequently, as illustrated in FIG. 6, the weld piece 81 is bent from the first folded portion 80 toward the receiving portion 79, and the wire 73 is interposed between the weld piece 81 and the receiving portion 79.

Subsequently, the central conductor 74 of the wire 73 and the weld piece 81 are welded to each other. More specifically, laser beam welding is used. The weld piece 81 that is in the state illustrated in FIG. 6 is irradiated with a laser beam, and the central conductor 74 of the wire 73 and the weld piece 81 are thereby melted. As illustrated in FIG. 7 and FIG. 8, a liquefied weld nugget portion is formed into a ball shape due to surface tension. Consequently, the expanding portion 84 is formed as described above.

During the above welding process, the melted metal protrudes from the receiving portion 79 of the metal terminal 72 and reaches the bent portion 78 or the base 77 in some cases. Consequently, heat due to such excessive welding causes the metal terminal 72 to deform undesirably.

According to the technique disclosed in Japanese Patent No. 4184394, the portion of the insulating coating 75 in contact with the receiving portion 79 is not removed and remains as described above to prevent the above excessive welding. That is, it can be said that a provisional measure is considered according to the above technique disclosed in Japanese Patent No. 4184394 to prevent the excessive welding.

SUMMARY

A metal terminal that is formed by using a metal plate typically has a tin-plating surface and a non-tin-plating surface on which tin plating is not performed. More specifically, a surface of the metal terminal that is soldered to a mounting substrate when a coil component is mounted is the tin-plating surface to have good wettability. Another surface of the metal terminal that adheres to a core with an adhesive is the non-tin-plating surface because the tin-plating surface makes a tin plating film likely to melt at a temperature at which soldering is performed by reflow, and adhesion between the metal terminal and the core is hindered.

The metal terminal 72 illustrated in FIG. 5 to FIG. 8 will be more specifically described. A surface of the metal terminal 72 denoted by "A" is the tin-plating surface that is soldered. A surface of the metal terminal 72 denoted by "B" is the non-tin-plating surface and adheres to the core, more specifically, to the flange portion 71 with the adhesive.

Attention is paid to the weld piece 81 that is irradiated with the laser beam in the welding process. As illustrated in FIG. 6, the surface B, that is, the non-tin-plating surface of the weld piece 81 faces outward. Accordingly, the laser beam is radiated toward the non-tin-plating surface. The metal terminal 72 is composed of, for example, a copper alloy such as phosphor bronze, and the laser beam is radiated toward the copper alloy, which is the base material of the metal terminal 72.

However, copper has a relatively low efficiency of absorption of a laser beam. Accordingly, it takes a long time until the temperature reaches about 1000° C. at which the weld piece 81 can be melted and welded. For this reason, the metal terminal 72 and the wire 73 are exposed to excessive heat. The excessive heat causes pyrolysis of the adhesive with which the metal terminal 72 adheres to the flange portion 71 and causes heat shock to occur against the adhesive, which leads to a fall of the metal terminal 72 from the core, pyrolysis of the insulating coating 75 of the wire 73, and a change in quality of the insulating coating 75.

Accordingly, the present disclosure provides a method of manufacturing a coil component that enables laser welding to be finished in a decreased time, and the coil component that can be obtained by the manufacturing method.

According to preferred embodiments of the present disclosure, advantage is taken of the fact that tin has a higher efficiency of absorption of a laser beam than copper.

According to preferred embodiments of the present disclosure, a method of manufacturing a coil component includes a step of preparing a wire that includes a linear, central conductor and an insulating coating that covers a circumferential surface of the central conductor, a step of preparing a metal terminal that is to be electrically connected to the central conductor at an end portion of the wire and that has a surface on which a tin-containing film that contains tin is disposed and above which at least the end portion of the wire is to be disposed, and a step of welding the central conductor of the wire to the metal terminal by irradiating the tin-containing film with a laser beam with the end portion of the wire disposed along the tin-containing film.

According to preferred embodiments of the present disclosure, a coil component includes a wire that includes a linear, central conductor and an insulating coating that covers a circumferential surface of the central conductor, and a metal terminal that is electrically connected to the central conductor of the wire and that includes a receiving portion that receives the end portion of the wire.

A tin-containing film that contains tin is disposed on a surface of the metal terminal that faces in the same direction as a surface of the receiving portion above which the end portion of the wire is disposed. The receiving portion includes a welded portion at which the central conductor is weld to the receiving portion, and a non-welded portion adjacent thereto, and the welded portion and the non-welded portion are arranged in this order from an end to an intermediate portion of the wire in a longitudinal direction. The welded portion includes a weld nugget portion that is integrally formed by welding the central conductor and the receiving portion and that protrudes from the surface of the receiving portion above which the end portion of the wire is disposed. Tin is distributed along or near an imaginary extension surface of the tin-containing film that extends inside the weld nugget portion.

According to preferred embodiments of the present disclosure, the temperature of the metal terminal can reach the temperature at which the metal terminal can be welded in a relatively short time because the efficiency of absorption of the laser beam with which the tin-containing film is irradiated is relatively high. For this reason, the metal terminal and the wire can be prevented from being exposed to excessive heat during welding. Accordingly, in the coil component, thermal damage to the metal terminal and the wire can be reduced.

Other features, elements, characteristics and advantages of the present disclosure will become more apparent from the following detailed description of preferred embodiments of the present disclosure with reference to the attached drawings.

DETAILED DESCRIPTION

Figure 1A:
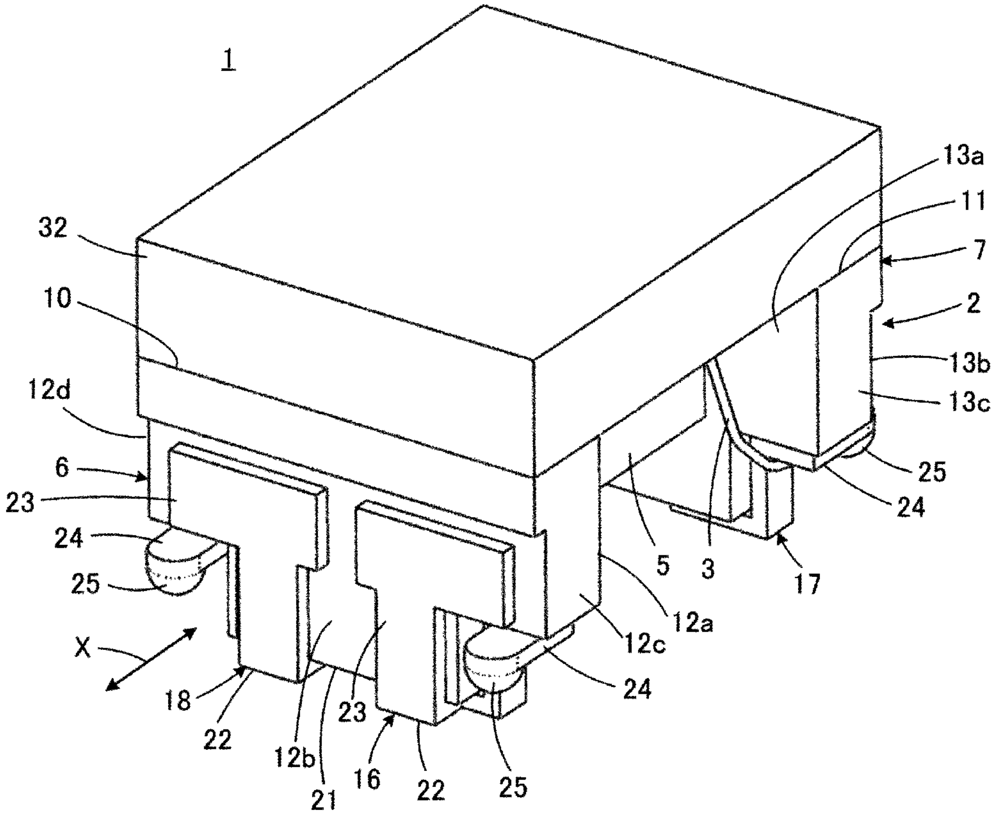
FIG. 1A is a perspective view of a coil component according to an embodiment of the present disclosure when viewed from a relatively upper position.
Figure 1B:
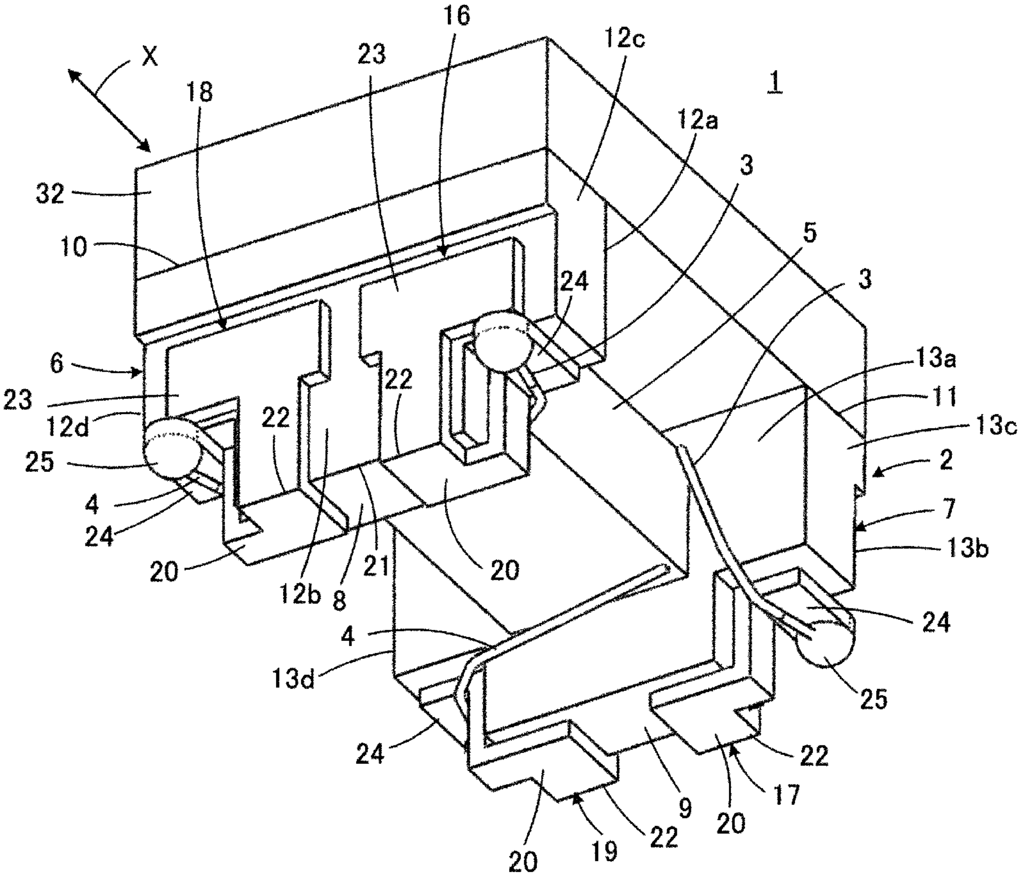
FIG. 1B is a perspective view of the coil component when viewed from a relatively lower position.

The overall structure of a coil component 1 according to an embodiment of the present disclosure will be described with reference to FIG. 1A and FIG. 1B. The coil component 1 illustrated in FIG. 1A and FIG. 1B forms, for example, a common-mode choke coil. In FIG. 1A and FIG. 1B, an illustration of principal parts of two wires is omitted.

The coil component 1 includes a drum-shaped core 2. A first wire 3 and a second wire 4 are wound around the drum-shaped core 2. The drum-shaped core 2 includes a winding core portion 5 that extends in an axial direction X, and a first flange portion 6 and a second flange portion 7 that are disposed on end portions of the winding core portion 5 that are opposite each other in the axial direction X. The drum-shaped core 2 is preferably composed of ferrite. The drum-shaped core 2 may be composed of a nonconductive material other than ferrite, for example, a non-magnetic material such as alumina, or a resin that contains ferrite powder or magnetic metal powder.

The winding core portion 5, the first flange portion 6, and the second flange portion 7 that are included in the drum-shaped core 2 have, for example, a substantially quadrangular prism shape having a substantially square sectional shape. Ridge line portions of the winding core portion 5, the first flange portion 6, and the second flange portion 7 having a substantially quadrangular prism shape are preferably round-chamfered although this is not illustrated. The sectional shape of the winding core portion 5, the first flange portion 6, and the second flange portion 7 may be a substantially polygonal shape such as a hexagon, a substantially circular shape, or a substantially ellipse shape, or a combination thereof, instead of a square.

The first flange portion 6 has a bottom surface 8 that extends in the axial direction X and that is to face a mounting substrate during mounting, and an upper surface 10 opposite the bottom surface 8. The first flange portion 6 also has an inner end surface 12*a* that extends upward from the bottom surface 8, that extends in the direction perpendicular to the mounting substrate, and that faces the winding core portion 5, an outer end surface 12*b* that extends upward from the bottom surface 8, that extends in the direction perpendicular to the mounting substrate, and that faces in the direction opposite the direction toward the winding core portion 5, and a first side surface 12*c* and a second side surface 12*d* that connect the inner end surface 12*a* and the outer end surface 12*b* to each other.

Similarly to the first flange portion 6, the second flange portion 7 has a bottom surface 9 that extends in the axial direction X and that is to face the mounting substrate during mounting, and an upper surface 11 opposite the bottom surface 9. The second flange portion 7 also has an inner end surface 13*a* that extends upward from the bottom surface 9, that extends in the direction perpendicular to the mounting substrate, and that faces the winding core portion 5, an outer end surface 13*b* that extends upward from the bottom surface 9, that extends in the direction perpendicular to the mounting substrate, and that faces in the direction opposite the direction toward the winding core portion 5, and a first side surface 13*c* and a second side surface 13*d* that connect the inner end surface 13*a* and the outer end surface 13*b* to each other.

Steps that are formed so as to protrude along upper sides of the outer end surfaces 12*b* and 13*b* of the flange portions 6 and 7 are not essential and may not be formed.

A first metal terminal 16 and a third metal terminal 18 are spaced from each other and mounted on the first flange portion 6 with an adhesive. A second metal terminal 17 and a fourth metal terminal 19 are spaced from each other and mounted on the second flange portion 7 with an adhesive. Each of the first to fourth metal terminals 16 to 19 is typically manufactured by processing a metal plate that is composed of a copper alloy such as phosphor bronze or tough pitch copper. The metal plate has a thickness of no less than 0.10 mm and no more than 0.15 mm (i.e., from 0.10 mm to 0.15 mm), for example, a thickness of about 0.1 mm.

As illustrated in FIG. 1A and FIG. 1B, each of the first metal terminal 16 and the third metal terminal 18 includes a basal portion 20 that extends along the bottom surface 8 of the first flange portion 6, and a rising portion 23 that is connected to the basal portion 20 across a bent portion 22 covering a ridge line portion 21 along which the outer end surface 12*b* and the bottom surface 8 of the first flange portion 6 intersect each other, and that extends along the outer end surface 12*b* of the first flange portion 6. Each of the first metal terminal 16 and the third metal terminal 18 also includes a receiving portion 24 that extends from the basal portion 20 and that receives an end portion of the first wire 3 or the second wire 4. It is preferable that the receiving portion 24 be slightly spaced from the drum-shaped core 2.

In FIG. 1A and FIG. 1B, the second metal terminal 17 and the fourth metal terminal 19 are partly illustrated. The above first metal terminal 16 and the fourth metal terminal 19 have the same shape. The second metal terminal 17 and the above third metal terminal 18 have the same shape. Accordingly, reference characters 20, 22, 23, and 24 that designate the basal portion, the bent portion, the rising portion, and the receiving portion of each of the above first metal terminal 16 and the above third metal terminal 18 are also used to designate those of the second metal terminal 17 and the fourth metal terminal 19 as needed.

A first end of the first wire 3 is electrically connected to the receiving portion 24 of the first metal terminal 16. A second end of the first wire 3 opposite the first end is electrically connected to the receiving portion 24 of the second metal terminal 17. A first end of the second wire 4 is electrically connected to the receiving portion 24 of the third metal terminal 18. A second end of the second wire 4 opposite the first end is electrically connected to the receiving portion 24 of the fourth metal terminal 19. These are electrically connected by laser welding with laser beam irradiation. FIG. 1A and FIG. 1B illustrate weld nugget portions 25 each of which bulges into a hemispherical shape as a result of laser welding. Processes of connecting the first to fourth metal terminals 16 to 19 and the first and second wires 3 and 4 by laser welding, and the structure of each weld nugget portion 25 will be described in detail later with reference to FIG. 3A, FIG. 3B, and FIG. 4.

Figure 2:
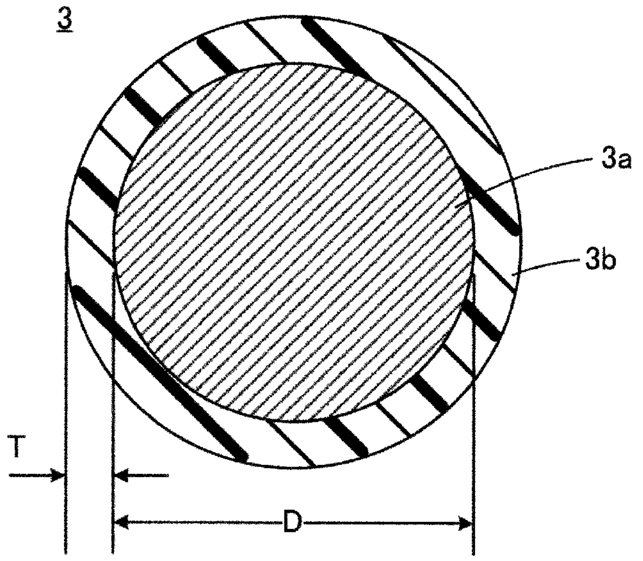
FIG. 2 is an enlarged sectional view of a first wire that is included in the coil component illustrated in FIGS. 1A and 1B.

FIG. 2 is an enlarged sectional view of the first wire 3 that is included in the coil component 1. The first wire 3 and the second wire 4 have substantially the same sectional shape. The first wire 3 illustrated in FIG. 2 will now be described, but a description of the second wire 4 is omitted.

As illustrated in FIG. 2, the first wire 3 typically has a substantially circular sectional shape and includes a linear, central conductor 3*a* and an insulating coating 3*b* that covers the circumferential surface of the central conductor 3*a* and that is composed of an electrically insulating resin. The diameter D of the central conductor 3*a* is, for example, no less than 28 μm and no more than 50 μm (i.e., from 28 μm to 50 μm). The thickness T of the insulating coating 3*b* is, for example, no less than 3 μm and no more than 6 μm (i.e., from 3 μm to 6 μm). The central conductor 3*a* is composed of, for example, good conductive metal such as copper. The insulating coating 3*b* is composed of a resin that contains at least an imide linkage such as polyamide imide or imide-modified polyurethane.

The first wire 3 and the second wire 4 are spirally wound around the winding core portion 5 in the same direction although an illustration thereof is omitted in FIG. 1A and FIG. 1B. More specifically, the first wire 3 and the second wire 4 may be wound so as to form two layers such that the first wire 3 or the second wire 4 is wound inside, and the other is wound outside, or may be wound so as to form a single layer such that the turns of each wire are alternately arranged in the axial direction of the winding core portion 5 and are parallel with each other. In the latter case, the two wires 3 and 4 are simultaneously wound in a bifilar winding manner.

After a process of winding the first wire 3 and the second wire 4 is finished, the processes of connecting the first wire 3 and the second wire 4 and the first to fourth metal terminals 16 to 19 are performed as described below.

Figure 3A:
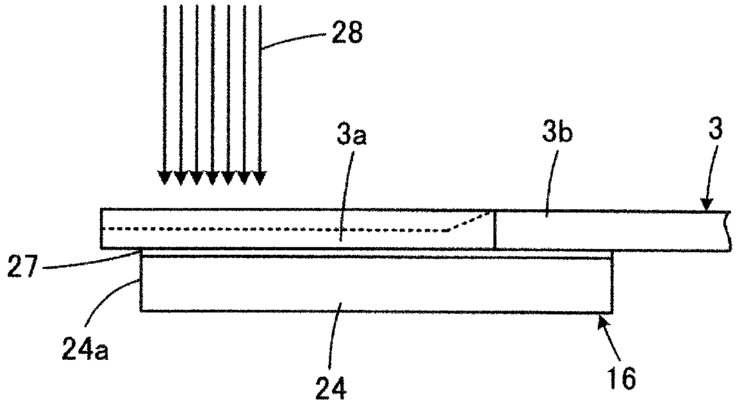
FIG. 3A and FIG. 3B schematically illustrate a welding process of electrically connecting the first wire to a first metal terminal in the coil component illustrated in FIGS. 1A and 1B.
Figure 3B:
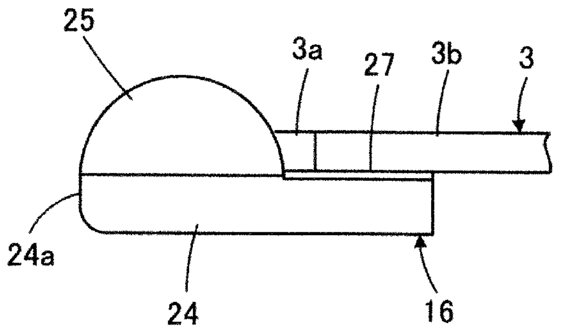

The process of connecting the first wire 3 to the first metal terminal 16 will now be representatively described with reference to FIG. 3A and FIG. 3B. Accordingly, in the following description, the "first wire" is referred to simply as the "wire", and the "first metal terminal" is referred to simply as the "metal terminal". FIG. 3A and FIG. 3B schematically illustrate the receiving portion 24 of the metal terminal 16 and the end portion of the wire 3. In FIG. 3A and FIG. 3B, a laser beam 28 is directed from above to below. This relationship in the vertical direction is opposite to that in FIG. 1A and FIG. 1B.

Right after the above winding process is finished, as illustrated in FIG. 3A, the end portion of the wire 3 is located on the receiving portion 24. At this time, the wire 3 extends so as to reach an end 24*a* of the receiving portion 24, and the end 24*a* is located near the end of the wire 3 in the longitudinal direction and is to be irradiated with the laser beam.

A tin-containing film 27 that contains tin is disposed on a surface of the receiving portion 24 above which the end portion of the wire 3 is disposed. The tin-containing film 27 has a thickness of, for example, no less than 0.5 μm and no more than 20 μm (i.e., from 0.5 μm to 20 μm). The tin-containing film 27 is preferably formed in a manner in which a tin plating film is formed on a first main surface of the metal plate that corresponds to the material of the metal terminal 16. The reason is that the tin-containing film 27 can be efficiently disposed on the receiving portion 24.

The tin-containing film 27 is not limited to formation by plating and may be formed by printing paste that contains tin powder or by attaching tin foil. In the case of printing the paste that contains tin powder, however, there is a concern that a solvent is vaporized, and a blowhole is produced in the weld nugget portion 25 due to heat generated in a welding process described later. To avoid this concern, the tin-containing film 27 is preferably formed by plating or by attaching the foil.

As illustrated in FIG. 3A, the insulating coating 3*b* is removed from the entire circumference of the end portion of the wire 3. The insulating coating 3*b* is removed by using, for example, laser beam irradiation.

Subsequently, thermo-compression bonding of the end portion of the wire 3 to the tin-containing film 27 is performed. Consequently, as illustrated by a dashed line in FIG. 3A, it is preferable that the end portion of the wire 3 be flattened into an oblong shape, and that the end portion of the wire 3 be temporarily secured to the metal terminal 16 by melting the tin-containing film 27. At this time, the tin-containing film 27 is melted once, but the presence of the tin-containing film 27 is maintained, and the end portion of the wire 3 is brought into contact with the tin-containing film 27 such that the major axis direction of a section of the oblong shape is along a surface of the tin-containing film 27. This enables the end portion of the wire 3 and the receiving portion 24 to be brought into close contact with each other, and a contact area therebetween can be relatively wide. Accordingly, in the welding process described later, heat that causes the receiving portion 24 to melt is rapidly conducted to the central conductor 3*a* of the wire 3, and welding can be finished in a decreased time.

According to the embodiment, the end portion of the wire 3 and the receiving portion 24 are preferably, but not necessarily, brought into close contact with each other. When the receiving portion 24 and the end portion of the wire 3 are partly in contact with each other, the heat that causes the receiving portion 24 to melt is conducted to the wire 3, and welding can be finished in a decreased time.

Subsequently, as illustrated in FIG. 3A again, at least the tin-containing film 27 is irradiated with the laser beam 28 for welding with the end portion of the wire 3 disposed along the tin-containing film 27. At this time, the central conductor 3*a* of the wire 3 that is exposed from the insulating coating 3*b* can also be irradiated with the laser beam 28. However, only the tin-containing film 27 is preferably irradiated. The reason is that the tin-containing film 27 has a higher efficiency of absorption of the laser beam 28 than that of the central conductor 3*a* that is composed of, for example, copper, the temperature more rapidly reaches the melting temperature of tin, and liquified tin further increases the efficiency of absorption of the laser beam 28. In addition, the central conductor 3*a* and the insulating coating 3*b* of the wire 3 are unlikely to be degraded due to laser beam irradiation.

After the tin is liquified and the efficiency of absorption of the laser beam 28 is further increased as above, the base material of the receiving portion 24 such as phosphor bronze is readily melted. Consequently, as illustrated in FIG. 3B, the central conductor 3*a* can be welded to the receiving portion 24 in a short time. At this time, the melted central conductor 3*a* and the melted receiving portion 24 are formed into a ball shape due to surface tension acting thereon, and the weld nugget portion 25 is formed. The weld nugget portion 25 is integrally formed by welding the central conductor 3*a* and the receiving portion 24. The central conductor 3*a* is contained in the weld nugget portion 25.

Conditions of irradiation of the laser beam 28 include pulse irradiation with, for example, a YAG laser, a plus width of no less than 1.0 ms and no more than 10.0 ms (i.e., from 1.0 ms to 10.0 ms), a wave length of 1064 nm, and a peak power of no less than 0.5 kW and no more than 2.0 kW (i.e., from 0.5 kW to 2.0 kW). The laser beam 28 is preferably radiated in the direction perpendicular to the surface of the tin-containing film 27 but may be inclined about ±10 degrees with respect to the perpendicular direction.

It is preferable that the receiving portion 24 be slightly spaced from the drum-shaped core 2 as described above. This structure is not essential. With this structure, however, the increased temperature of the receiving portion 24 is unlikely to be conducted to the drum-shaped core 2 in the above welding process, and an adverse effect on the drum-shaped core 2 due to the heat can be reduced.

Figure 4:
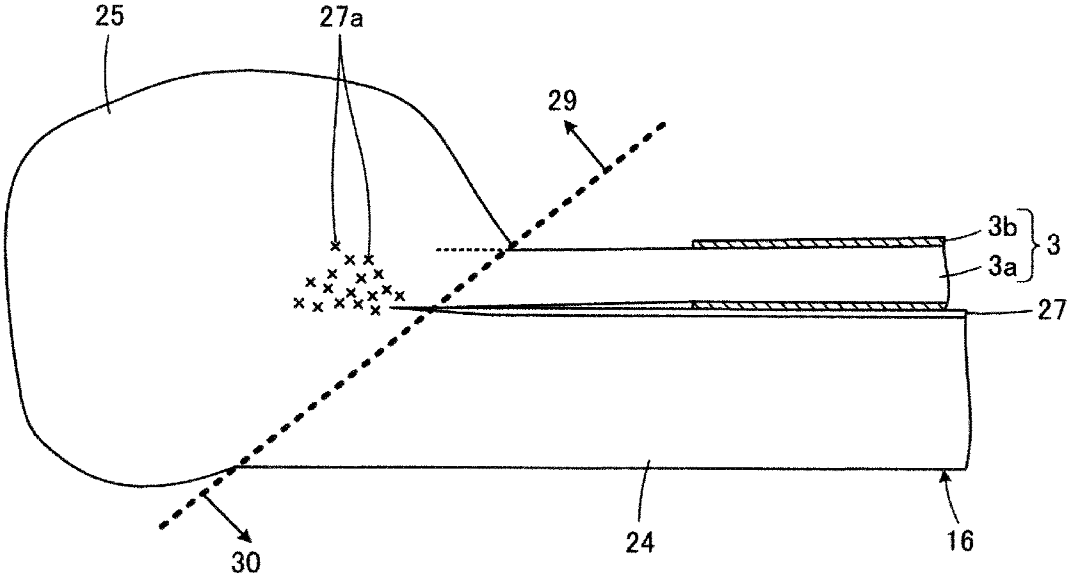
FIG. 4 is an enlarged view of a section of the electrical contact between the first wire and the first metal terminal that is obtained in the welding process illustrated in FIG. 3A and FIG. 3B.
Figure 5:
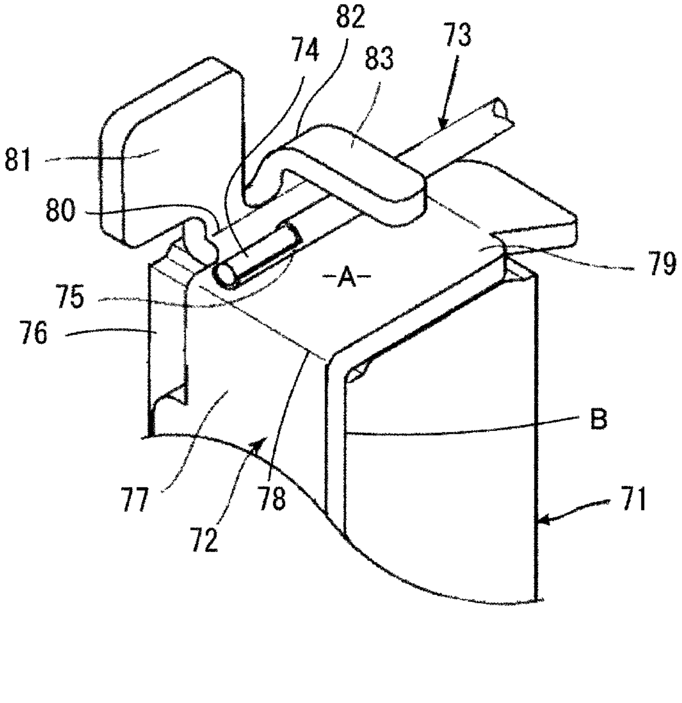
FIG. 5 is a perspective view of a flange portion of a core that is included in a coil component disclosed in Japanese Patent No. 4184394, a metal terminal that is disposed thereon, and a wire that is connected to the metal terminal and illustrates a state before welding where the wire is interposed between a receiving portion and a holding portion and temporarily secured, and a weld piece is not bent toward the receiving portion.
Figure 6:
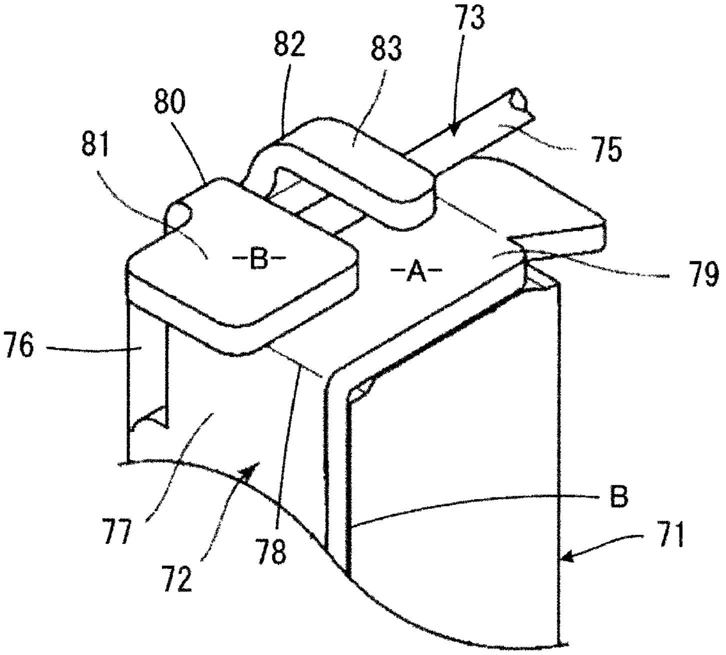
FIG. 6 is a perspective view corresponding to FIG. 5 and illustrates a state before welding where the weld piece is bent from a first folded portion toward the receiving portion in the state illustrated in FIG. 5, and the wire is interposed between the weld piece and the receiving portion.
Figure 7:
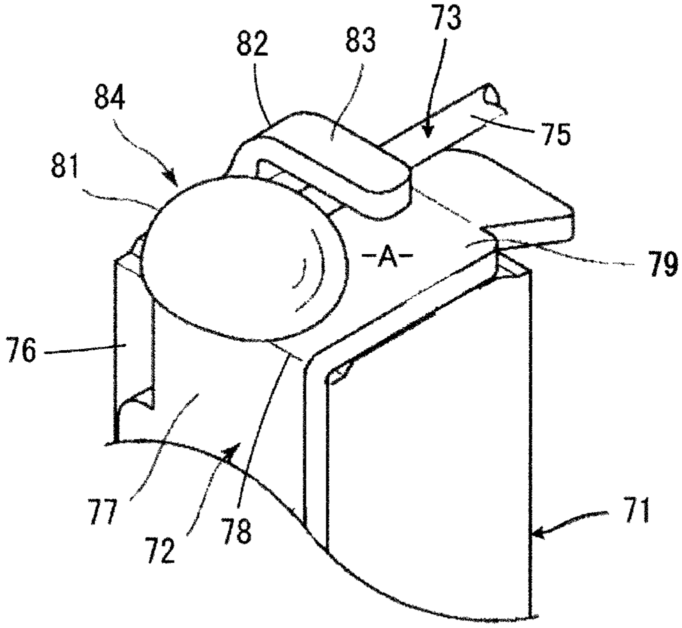
FIG. 7 corresponds to FIG. 5 and illustrates a state where the weld piece is irradiated with a laser beam in the state illustrated in FIG. 6, a central conductor of the wire and the weld piece have been welded to each other.
Figure 8:
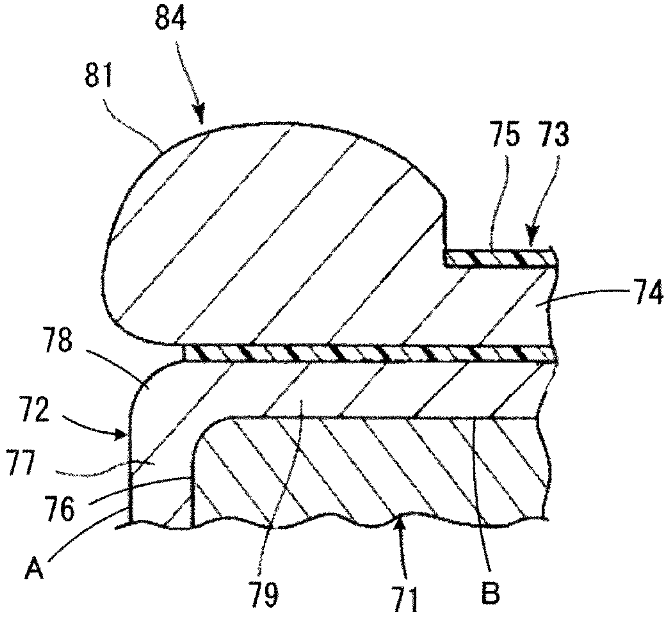
FIG. 8 is an enlarged sectional view of a welded portion illustrated in FIG. 7.

FIG. 4 is an enlarged view of a section of the electrical contact between the wire 3 and the metal terminal 16 that is obtained in the welding process illustrated in FIG. 3A and FIG. 3B. FIG. 4 is a diagram that is drawn by tracing a picture of the section of the electrical contact. In FIG. 4, the relationship in the vertical direction is opposite to that in FIG. 1A and FIG. 1B as in FIG. 3A and FIG. 3B.

Referring to FIG. 4, as a result of the welding process, the weld nugget portion 25 and the receiving portion 24 that remains after welding are welded to each other and integrally formed. The central conductor 3*a* of the wire 3 is located between the receiving portion 24 and the weld nugget portion 25 and contained in the weld nugget portion 25.

More specifically, the receiving portion 24 includes a welded portion 29 at which the central conductor 3*a* is weld to the receiving portion 24, and a non-welded portion 30 adjacent thereto, and the welded portion 29 and the non-welded portion 30 are arranged in this order from the end to an intermediate portion of the wire 3 in the longitudinal direction. In FIG. 4, the boundary between the welded portion 29 and the non-welded portion 30 is illustrated by a dotted straight line for convenience. However, in practice, such a clear boundary does not emerge in many cases.

The welded portion 29 includes the weld nugget portion 25 that is integrally formed by welding the central conductor 3*a* and the receiving portion 24 and that protrudes from the surface of the receiving portion 24 above which the end portion of the wire 3 is disposed, that is, the surface on which the tin-containing film 27 is disposed. Tin 27*a* is distributed along or near an imaginary extension line of the tin-containing film 27 that extends inside the weld nugget portion 25. In FIG. 4, the distribution of the tin 27*a* is illustrated by x marks. The tin 27*a* originates from tin that is contained in the tin-containing film 27 and is distributed near the surface of the receiving portion 24 on which the tin-containing film 27 is disposed in a larger amount than an amount in which the tin is distributed near the surface of the receiving portion 24 opposite the surface on which the tin-containing film 27 is disposed, that is, the surface on which the tin-containing film 27 is not disposed. This characteristic structure is obtained by irradiating the tin-containing film 27 with the laser beam with the end portion of the wire 3 disposed along the tin-containing film 27 to weld the central conductor 3*a* of the wire 3 to the metal terminal 16.

Attention is paid to the surface of the metal terminal 16 on which the tin-containing film 27 is disposed. In the above description, the tin-containing film 27 is disposed on the surface of the receiving portion 24 above which the end portion of the wire 3 is disposed. The tin-containing film 27 is typically disposed on an entire first main surface of the metal plate that corresponds to the material of the metal terminal 16. The basal portion 20, the rising portion 23, and the receiving portion 24, for example, are formed by bending the metal plate. In this case, as illustrated in, for example, FIG. 1B, the surface of the receiving portion 24 above which the end portion of the wire 3 is disposed faces in the same direction as the surface of the metal plate, which is bend, to be soldered when the coil component 1 is mounted. In other words, the tin-containing film 27 that is disposed on the surface of the receiving portion 24 above which the end portion of the wire 3 is disposed extends to the surface to be soldered when the coil component 1 is mounted.

Accordingly, the tin-containing film that is disposed on the first main surface of the metal plate has a function of decreasing the time of laser welding for connecting the wire 3 to the receiving portion 24 of the metal terminal 16 and a function of improving solder wettability when the metal terminal 16 is soldered.

However, the tin-containing film is typically not disposed on a second main surface of the metal plate. Accordingly, in the case where the receiving portion 24 is formed such that the metal plate is not folded, the base material of the metal terminal 16 is exposed form the surface of the receiving portion 24 opposite the surface above which the end portion of the wire 3 is disposed. As seen from, for example, FIG. 1B, the surface from which the base material is exposed, which corresponds to the second main surface of the metal plate, is in contact with the adhesive with which the metal terminal 16 adheres to the flange portion 6 of the drum-shaped core 2. If a tin-containing film is disposed on this surface, there is a possibility that the tin-containing film is likely to melt at a temperature at which soldering is performed by reflow, and adhesion is hindered. Accordingly, it is preferable that no tin-containing film be disposed on the surface of the receiving portion 24 opposite the surface above which the end portion of the wire 3 is disposed, and the base material of the metal terminal 16 be exposed therefrom.

The connection between the first metal terminal 16 and the first wire 3 is described above. The same processes are performed for the connections between the other metal terminals 17 to 19 and the wire 3 or 4, and the same connection structure is obtained.

The use of a welding method and a weld structure described above for the coil component 1 illustrated in FIG. 1A and FIG. 1B prevents the metal terminals 16 to 19 and the wires 3 and 4 from being exposed to excessive heat. This prevents pyrolysis of the adhesive with which the metal terminals 16 to 19 adhere to the flange portions 6 and 7, the occurrence of heat shock against the adhesive, which leads to a fall of each of the metal terminals 16 to 19 from the drum-shaped core 2, pyrolysis of the insulating coating 3*b* of each of the wires 3 and 4, and a change in quality of the insulating coating 3*b*.

After the above process of winding the first and second wires 3 and 4, and the processes of connecting the first and second wires 3 and 4 to the first to fourth metal terminals 16 to 19, as illustrated in FIG. 1A and FIG. 1B, a plate core 32 that is composed of, for example, ferrite is joined to the upper surfaces 10 and 11 of the first flange portion 6 and the second flange portion 7 with an adhesive. In this way, the drum-shaped core 2 and the plate core 32 forms a closed magnetic circuit, and accordingly, the inductance value can be improved.

A nickel film may be disposed below the tin-containing film 27 in the first metal terminal 16. The plate core 32 may be replaced with a magnetic resin plate or a metal plate that can form a magnetic circuit. The coil component 1 may not include the plate core 32.

A coil component according to the present disclosure is described above on the basis of the embodiment of the common-mode choke coil. The embodiment is described by way of example, and other various modifications can be made. Features can be partially replaced or combined between embodiments.

The number of the wires included in the coil component, the winding direction of the wires, and the number of the metal terminals, for example, can be changed in accordance with the function of the coil component.

A coil component according to the present disclosure may include no core such as the drum-shaped core.

While preferred embodiments of the disclosure have been described above, it is to be understood that variations and modifications will be apparent to those skilled in the art without departing from the scope and spirit of the disclosure. The scope of the disclosure, therefore, is to be determined solely by the following claims.

What is claimed is:

1. A method of manufacturing a coil component, comprising:

preparing a wire that includes a linear, central conductor of copper and an insulating coating that covers a circumferential surface of the central conductor;

preparing a metal terminal that is configured to electrically connect to the central conductor at an end portion of the wire, a plurality of surfaces of the metal terminal being formed of a metal plate of the metal terminal, the metal plate being composed of a copper alloy;

disposing a tin-containing film on a receiving surface of the plurality of surfaces of the metal terminal, sandwiching the tin-containing film between the central conductor and the receiving surface of the metal terminal, leaving the metal plate exposed on at least one surface of the plurality of surfaces of the metal terminal and disposing at least the end portion of the wire on the tin-containing film; and welding the central conductor of the wire to the metal terminal by irradiating the tin-containing film with a laser beam with the end portion of the wire disposed along the tin-containing film, wherein during the welding of the central conductor of the wire to the metal terminal, a weld nugget portion is integrally formed by welding the central conductor and a receiving portion and that protrudes from a surface of the receiving portion above which the end portion of the wire is disposed.

2. The method according to claim 1, wherein the tin-containing film is a tin plating film.

3. The method according to claim 2, wherein during the welding of the central conductor of the wire to the metal terminal, the laser beam is radiated with the end portion of the wire being in contact with the tin-containing film.

4. The method according to claim 1, wherein during the welding of the central conductor of the wire to the metal terminal, the laser beam is radiated with the end portion of the wire being in contact with the tin-containing film.

5. The method according to claim 4, wherein during the welding of the central conductor of the wire to the metal terminal further includes flattening the end portion of the wire into an oblong shape and temporarily securing the end portion of the wire to the metal terminal by thermo-compression bonding of the end portion of the wire to the tin-containing film before the step of irradiation of the laser beam, and the end portion of the wire is brought into contact with the tin-containing film such that a major axis direction of a section of the oblong shape of the wire is along a surface of the tin-containing film.

6. The method according to claim 1, wherein the copper alloy comprises phosphor bronze or tough pitch copper.

7. The method according to claim 1, wherein disposing the tin-containing film on the receiving surface comprises plating the tin-containing film on the receiving surface or attaching tin foil to the receiving surface.

8. The coil component according to claim 1, further comprising:

extending the wire onto a first end of the metal terminal and across the tin-containing film, wherein the welding comprises welding the central conductor of the wire to the metal terminal by irradiating the tin-containing film at a second, opposite end of the metal terminal from the first end of the metal terminal with the laser beam with the end portion of the wire disposed along the tin-containing film.

9. The coil component according to claim 1, wherein the welding comprises pulse irradiating the tin-containing film with a yttrium aluminum garnet (YAG) laser, a pulse width of the YAG laser is no less than 1.0 ms and no more than 10.0 ms, a wavelength of the YAG laser is 1064 nm, and a peak power of the YAG laser is no less than 0.5 kW and nor more than 2.0 kW.

* * * * *